Patented Feb. 28, 1933

1,899,339

UNITED STATES PATENT OFFICE

LUDWIG KLEBERT, OF COLOGNE-DEUTZ, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR THE PREPARATION OF GRANULATED ACTIVE CHARCOAL

No Drawing. Application filed December 9, 1929, Serial No. 412,923, and in Germany December 13, 1928.

The present invention relates to a process for the production of granulated charcoal and to the products obtainable thereby.

The process for performing the invention consists in mixing a carbonized material that means a carbon obtained from vegetable material by carbonizing with heat at about 400–500° C., for instance, charcoal from wood, with an organic binding agent, such as pitch, tar, mazout, and with two inorganic materials, the first of which is clay or kaolin. As second inorganic material a product is chosen which lowers the sintering temperature of the clay or kaolin to below 1000° C. as, for instance, the chlorides of the alkali metals. The mixture is shaped under pressure and activated by means of gases, such as, for instance, steam at a temperature of about 850–950° C.

It is the purpose of the second inorganic material to lower the sintering temperature of the clay or kaolin so that a sintering of the inorganic skeleton of the grain is effected whereby a strong binding of the particles of the carbon and the clay or kaolin occurs. It is therefore necessary that this additional substance sinters or melts below 1000° C. which is the maximum activating temperature, or that it produces a compound with clay or kaolin which sinters or melts below 1000° C., by thermal or chemical decomposition during the activating process. The following compounds may be mentioned by way of example: the chlorides and nitrates of the alkali metals and of calcium, the oxides, hydroxides and carbonates of the alkali metals, and the chlorides and nitrates of the heavy metals, such as ferrous chloride.

The quantities of the three additional materials employed, that is, organic binding agent, clay or kaolin, and the inorganic agent lowering the sintering temperature, may be varied in wide limits; I prefer to use about 30–60% of organic binding agent, 2–4% of clay or kaolin and 0.2–1% of the substance lowering the sintering temperature, calculated upon the quantity of the charcoal employed.

The following example illustrates my invention without limiting it thereto:

*Example.*—100 parts by weight of finely powdered charcoal (fir wood coal) are well mixed with 3.5 parts by weight of clay and 0.5 parts by weight of potassium hydroxide. Into this mixture 45 parts of tar are stirred, and the mixture is then pressed, in a press for wire cutting, through a matrix of 40 mm. thickness and 4 mm. width of aperture at a pressure of about 50 to 75 atmospheres. The threads obtained are activated with steam at a temperature of about 950°.

I claim:

1. Process for preparing a granular highly active charcoal comprising mixing charcoal with a binding agent of the group consisting of clay and kaolin, a substance lowering the sintering temperature of the binding agent to below 1000° C., of the group consisting of the chlorides and nitrates of the alkali metals and of calcium, the oxides, hydroxides and carbonates of the alkali metals, the chlorides and nitrates of the heavy metals, and an organic binding agent, shaping the mixture and activating it at a temperature of about 850–1000° C.

2. Process for preparing a granular highly active charcoal comprising mixing about 100 parts by weight of charcoal with 2 to 4 parts by weight of a binding agent of the group consisting of clay and kaolin, 0.2 to 1 parts by weight of a substance, lowering the sintering temperature of the binding agent to below 1000° C., of the group consisting of the chlorides and nitrates of the alkali metals and of calcium, the oxides, hydroxides and carbonates of the alkali metals, the chlorides and nitrates of the heavy metals and 30 to 60 parts by weight of an organic binding agent, shaping the mixture and activating it at a temperature of about 850–1000° C.

3. Process for preparing a granular highly active charcoal comprising mixing about 100 parts by weight of fir wood coal with 3.5 parts by weight of clay, 0.5 parts by weight of potassium hydroxide and 45 parts by weight of tar, shaping the mixture and activating it at a temperature of about 850–950° C. with steam.

4. Process for preparing a granular highly active charcoal comprising mixing charcoal with a binding agent of the group consisting of clay and kaolin, a substance lowering the sintering temperature of the binding agent to below 1000° C. known from the ceramic industry and an organic binding agent, shaping the mixture and activating it at a temperature of about 850–1000° C.

In testimony whereof, I affix my signature.

LUDWIG KLEBERT.